United States Patent [19]
Rose et al.

[11] Patent Number: 5,290,636
[45] Date of Patent: Mar. 1, 1994

[54] FLAME RETARDANT BROMINATED STYRENE-BASED COATINGS

[75] Inventors: Richard S. Rose, West Lafayette; Jin-liang Wang; Nicolai A. Favstritsky, both of Lafayette; David E. May, Williamsport; David J. Honkomp, Lafayette, all of Ind.

[73] Assignee: Great Lakes Chemical Corp., W. Lafayette, Ind.

[21] Appl. No.: 875,359

[22] Filed: Apr. 29, 1992

Related U.S. Application Data

[63] Continuation-in-part of Ser. No. 578,583, Sep. 6, 1990, abandoned.

[51] Int. Cl.$^5$ ............................................. B32B 27/32
[52] U.S. Cl. .................................... 428/521; 428/290; 428/483; 428/520; 428/522; 428/920; 428/921; 524/551; 524/557; 526/293; 526/296
[58] Field of Search ............... 428/290, 483, 521, 522, 428/920, 921, 520; 524/551, 557; 526/293, 296, 551

[56] References Cited

U.S. PATENT DOCUMENTS

| | | | |
|---|---|---|---|
| 3,766,189 | 10/1973 | Blackford, Jr. ................ | 260/285 |
| 3,877,974 | 4/1975 | Mischutin ....................... | 428/290 |
| 4,054,733 | 10/1977 | Hall et al. ....................... | 526/293 |
| 4,224,217 | 9/1980 | Dennis et al. .................. | 260/45.7 R |
| 4,412,051 | 10/1983 | de Man et al. ................. | 526/293 |

FOREIGN PATENT DOCUMENTS 907229 8/1972 Canada .
79200767.6 12/1979 European Pat. Off. .
79200768.4 12/1979 European Pat. Off. .
90122620.9 11/1990 European Pat. Off. .

Primary Examiner—Paul J. Thibodeau
Assistant Examiner—D. S. Nakarani
Attorney, Agent, or Firm—Woodard, Emhardt, Naughton, Moriarty & McNett

[57] ABSTRACT

Improved flame retardant latex coatings are disclosed which comprise copolymers of ring-halogenated aromatic monomer units and alkyl acrylate/methacrylate monomer units, and which may additionally include at least one other monomer. In a first embodiment, the coatings include ring-brominated aromatic monomer units and alkyl acrylate and/or alkyl methacrylate monomer units. In a second embodiment, the coatings include these first two types of monomer units and further include third monomer units from unsaturated esters of saturated carboxylic acids, halogen-free aromatic monomers or unsaturated carboxylic or dicarboxylic acid monomers. In a third embodiment, the coatings include four monomer units, namely ring-brominated aromatic monomer units, alkyl acrylate/methacrylate monomer units, halogen-free aromatic monomer units and unsaturated carboxylic or dicarboxylic acid monomer units. In one aspect, the halogenated aromatic monomers are present in an amount to provide from 7 to 20 weight percent bromine in the final latex coating. In another aspect, the halogenated aromatic monomers include polybrominated monomers, particularly to provide monomers having an average of at least about 1.5 bromines per monomer unit. The coating polymers have glass transition temperatures in the −30° C. to 30° C. range and are useful, for example, for coating, paint, adhesive, sealant and non-woven binder applications.

24 Claims, No Drawings

FLAME RETARDANT BROMINATED STYRENE-BASED COATINGS

REFERENCE TO RELATED APPLICATIONS

This application is a continuation-in-part of U.S. patent application Ser. No. 07/578,583, filed on Sep. 6, 1990, and entitled FLAME RETARDANT BROMINATED STYRENE-BASED COATINGS, now abandoned.

BACKGROUND OF THE INVENTION

1. Field of the Invention

This invention relates to the use of latex compositions as coatings, including backcoatings, sealants, adhesives and the like, and particularly to coatings including ring-halogenated, ethylenically unsaturated aromatic monomers and at least one other monomer.

2. Description of the Prior Art

Acrylic, styrene-butadiene, styrene-acrylic, vinyl-acrylic, and vinyl acetate latices are commercially used in a variety of coatings. In many coatings applications, the latices used are desired to have flame-retarding properties. This applies in particular where latices are used in textiles, carpeting, paints, clear coatings, adhesives, sealants, caulking, non-woven binders and so on.

The usual method by which flame-retardant properties are imparted to latices is the blending-in of flame retardant additives. Many of these flame retardant additives contain bromine, such as brominated diphenyl or diphenyloxide compounds, together with antimony trioxide. However, such flame retardant additives have a major disadvantage in that their use gives rise to problems, such as the generation of strong white pigmenting and settling out effect, and toxicity resulting from the presence of antimony trioxide.

A common approach has been the addition of solid organic and inorganic compounds to latices to confer flame retardancy. U.S. Pat. No. 3,877,974 describes the admixture of an aqueous dispersion of a halogenated organic compound and metallic oxide with a polymeric adhesive binder. Although this approach has been shown to provide the desired flame retardancy, many undesirable features are again introduced. Solids ultimately separate from the latex emulsion despite any dispersion techniques employed. The dispersions tend to be high in viscosity and impede application of the latex. Latex coatings become stiffer due to the presence of solids, interfering with the flexibility or "hand" of the latex. In addition, solids tend to have a pigmenting effect which masks or changes the color of the substrate.

Liquid compounds have been added to latices as well. U.S. Pat. No. 3,766,189 teaches the use of liquid chlorinated paraffin in a latex to achieve fire retardancy. Drawbacks to the use of liquids include migration from the polymer with time, separation from the liquid latex emulsion, adverse effect upon adhesion, plasticizing, swelling of the latex, and poor water resistance. Salts and other water soluble solids eliminate the problems of settling of solids, but contribute other problems cited as well as generally having an adverse effect upon the stability of the latex emulsion.

Chemical integration of monomers into latex polymers to impact flame retardancy has had limited success. Predominantly PVC based latices generally have only a marginal advantage in flammability over non-flame retarded analogs. Addition of more chlorine in the form of vinylidene chloride has been quite limited due to high cost.

Curable resin compositions containing a basic catalyst and a water solution of polymerized halogen-containing vinyl monomer and other vinyl monomers are disclosed in Japanese Pat. No. 56120754-A2, issued to Mitsui Toatsu Chemicals on Sep. 22, 1981. The Mitsui patent reports that water based suspensions or emulsions of vinyl polymers have weak resistance to water, cracking and soiling (staining), and that the proposed compositions overcome such shortcomings. The patent mentions various halogenated vinyl monomers, including brominated monomers, but does not disclose the use of polybrominated monomers.

Moreover, the Mitsui patent is limited to treatment of water, cracking and soiling properties. No recognition is contained in the Mitsui patent of the preparation of flame retardant latices utilizing brominated vinyl monomers, and the patent fails to disclose percentages of use for such monomers to achieve flame retardancy. The patent proposes that the halogen-containing monomer comprise at most 15% by weight of the copolymer, which corresponds to a bromine content in the resin of at most about 6%. The Mitsui patent further indicates that it is preferred to have a lower percentage of halogen-containing monomer of at most 10% by weight, corresponding to a bromine content of at most 4%. These percentages are insufficient to provide desirable flame retardancy. In preferring the lower bromine content, the Mitsui patent teaches away from the present invention.

Bromine-containing plastics are described in European Patent Application No. 79200768.4, filed by Stamicarbon B.V. on Dec. 15, 1979 (published Sep. 7, 1980 as No. 13,052-A1). The Stamicarbon application is directed to the preparation of plastic materials, including polyolefins, polystyrene, and copolymers of styrene and butadiene, styrene and acrylonitrile and ABS. The plastics of the Stamicarbon application require high levels of bromine, and are described as containing 20-44 weight percent of bromine.

Moreover, the polymer compositions in the Stamicarbon patent are not suitable as coating materials because they have inappropriately high glass transition temperature (Tg) values. Their materials would have "excessive stiffness and inability to form film properly at room temperature." In fact, they teach away from the present invention.

Charles R. Martens wrote ("Waterborne Coatings, Emulsion and Water-Soluble Paints", Reinhold, N.Y., 1981, p. 169): "Choice of monomers in emulsion polymerization reactions is largely determined by the end-use requirements of the polymer. The first factor to be taken into account in the choice of a monomer or monomer mixture is the record order or glass transition temperature (Tg) of the polymer desired. This is the characteristic temperature at which the system undergoes a change from a hard, brittle material to a softer, more flexible one. Since polymers are generally unable to form films from latexes at temperatures below the Tg, an obvious requirement is that the polymer be above the Tg at the application and use temperature. A further restriction is placed on the Tg of the polymer by the fact that polymers become very soft at temperatures too far above the Tg, resulting in poor hardness, blocking, abrasion resistance, dirt collection, and so on. A balance must be obtained, therefore, between the good flexibility, adhesion, coalescence, and so forth, obtained at temperatures farther above the Tg and the good mechanical resistance properties found closer to the Tg. This is generally accomplished in coatings intended for ambient use by using polymers having Tg's in the 0°–30° C. range."

According to the above principle, Tg must be lower than the temperature at which film formation is attempted. If we choose the polymer with the lowest Tg of any described in the Stamicarbon patent, the composition is 60 parts by wt. bromostyrene (118° C. Tg), 15 parts acrylonitrile (110° C.), and 25 parts octyl acrylate (lowest Tg at −70° C. of esters of acrylic acid). The Tg of this composition is 43.7° C., according to the following equation:

$$\frac{1}{Tg} = \frac{W_1}{Tg_1} + \frac{W_2}{Tg_2} + \ldots = \frac{W_n}{Tg_n}$$

Where Tg=multipolymer Tg in ° K., Wn=weight fraction of the monomer present and Tgn=the homopolymer Tg in ° K.

The Tg of the above composition, 43.7° C., in the Stamicarbon's patent is recognized as too high to be of commercial value as a coating or a paint due to excessive stiffness and inability to form film properly at room temperature.

The Stamicarbon's compositions containing 60 to 95% bromostyrene, i.e., 26.2% Br to 41.5% Br, are outside those of the current invention (7–20% Br). Criteria for monomer selection include the glass transition temperature (Tg), physical properties, and chemical resistance. It is clear that the Stamicarbon's polymer composition cannot be such as recited by the present invention. Further, one skilled in the art would not utilize the latex of Stamicarbon as a coating or a paint to render articles nonflammable.

There has remained a need for polymer latex coatings which possess desired flame retardant and film properties. The coatings of the present invention satisfy these needs, and provide useful fire-retardant fabric backcoatings, paints, adhesives, sealants, caulking, non-woven binders and a variety of other applications.

SUMMARY OF THE INVENTION

In accordance with the present invention, there are provided latex coatings which comprise copolymers of ring-halogenated, ethylenically-unsaturated aromatic monomers and alkyl acrylate or methacrylate monomers, and which may also include at least one other monomer. In one aspect, the halogenated aromatic monomers are present in an amount to provide from 7 to 20 weight percent bromine in the final latex coating. In another aspect, the halogenated aromatic monomers include polybrominated monomers, particularly to provide monomers having an average of at least about 1.5 bromines per monomer unit.

The coatings of the present invention are exemplified by three categories. In a first embodiment, the coatings include ring-brominated aromatic monomer units and second monomer units from alkyl acrylate monomer units, alkyl methacrylate monomer units or combinations thereof. In a second embodiment, the coatings include these first two types of monomer units and further include third monomer units selected from unsaturated esters of saturated carboxylic acids, halogen-free aromatic monomers or unsaturated carboxylic or dicarboxylic acid monomers. In a third embodiment, the coatings include four monomer units, namely ring-brominated aromatic monomer units, alkyl acrylate and/or alkyl methacrylate monomer units, unsaturated carboxylic or dicarboxylic acid monomer units, and halogen-free aromatic monomers.

It is an object of the present invention to provide flame retardant polymer latex coatings which have desirable physical Properties.

A further object of the present invention is t provide flame retardant latex coatings which are useful for a wide variety of applications, including fabric backcoatings, paints, adhesives, sealants, caulking, non-woven binders and the like.

Further objects and advantages of the present invention will be apparent from the description which follows.

DESCRIPTION OF THE PREFERRED EMBODIMENT

For the purposes of promoting an understanding of the Principles of the invention, reference will now be made to the embodiments described hereafter. It will nevertheless be understood that no limitation of the scope of the invention is thereby intended, such alterations, further modifications and applications of the principles of the invention as described herein being contemplated as would normally occur to one skilled in the art to which the invention relates.

The present invention provides polymer latex coatings having advantageous physical properties making them useful in a wide variety of applications, and which coatings have improved flame retardancy over prior art compositions. Past efforts have failed to provide coatings of the described type, while it has now been discovered that the inclusion of ring-brominated aromatic monomer units in polymer latices yields coatings which provide improved flame retardancy without deleterious effects on other physical attributes of the coatings.

One, two or more monomers may be reacted with, for example, brominated styrene to produce the copolymer coatings of the present invention. Proper selection of monomers used in conjunction with the brominated aromatic monomer enables production of flame retardant coatings useful in a wide range of applications. As used herein, the term "coatings" is used in a broad sense and is intended to include applications to a substrate both as a laminate or as an interstitial filler. For example, included are uses as textile backcoatings for woven upholstery and draperies, carpet backing, non-woven filter media binders, paints, adhesives, caulks, sealants and the like, applied to the variety of suitable substrates.

The coatings of the present invention contain a ring-brominated aromatic monomer and at least one other monomer. The coatings of the present invention are exemplified by three categories of latex compositions. In a first embodiment, the coatings include ring-brominated aromatic monomer units and units selected from alkyl acrylate monomer units, alkyl methacrylate monomer units or combinations thereof. In a second embodiment, the coatings include these first two types of monomer units and further include third monomer units selected from unsaturated esters of saturated carboxylic acids, halogen-free aromatic monomers or unsaturated carboxylic or dicarboxylic acid monomers. In a third embodiment, the coatings include four monomer units, namely ring-brominated aromatic monomer units, alkyl acrylate and/or alkyl methacrylate monomer units, unsaturated carboxylic or dicarboxylic acid monomer units, and halogen-free aromatic monomers.

The present invention employs ring-brominated aromatic monomer units of the formula (I):

(I):

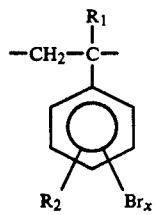

in which $X=1$ to 4, $R_1$ is —H or —$CH_3$, and $R_2$ is —H or an alkyl group having from 1 to 4 carbon atoms. Representative ring-halogenated aromatic monomers are styrene, methylstyrene, α-methylstyrene, α-methyl methylstyrene, ethylstyrene or α-methyl ethylstyrene with bromine substitution (mono, di, tri and tetra) in the phenyl nucleus. Mixtures or mixed isomers of the above monomers may also be used. As discussed more fully hereafter, the preferred ring-brominated aromatic monomer is polybrominated styrene, with dibromostyrene being most preferred. A preferred dibromostyrene material is one available from Great Lakes Chemical Corporation of West Lafayette, Ind., which material normally contains about 15 percent monobromostyrene and 3 percent tribromostyrene by weight.

In one aspect of the present invention, the ring-brominated aromatic monomer is included in the overall latex coating in an amount to provide sufficient bromine to yield the desired flame retardancy. In this respect, the ring-brominated monomer is included in an amount to provide from 7 to 20 percent bromine by weight of the overall composition. More preferably, the ring-brominated monomer is included in an amount to give from 9 to 18 percent bromine by weight.

In another aspect of the invention, it has been determined that it is preferable to utilize polybrominated forms of the ring-brominated aromatic monomer. This minimizes the number of ring-brominated monomer units required to achieve a given bromine weight percent of the overall composition. The use of a lower percentage of ring-brominated monomer units minimizes any adverse impact which such units would otherwise have on the physical properties of the latex coating. It is therefore an aspect of the present invention that the ring-brominated aromatic monomer units include polybrominated units, and that the ring-brominated monomer units include an average of at least about 1.5 bromines per unit. For coatings containing monobrominated forms of the ring-brominated aromatic monomer units, it is preferred that at most about 20% of the ring-brominated aromatic monomer units be monobrominated.

At the same time, it is desirable that the latex compositions used for the coatings be readily prepared. Highly brominated, ethylenically-unsaturated, aromatic monomers, such as pure tetrabromostyrene, are not liquid at room temperature, and this interferes with the ready preparation of the latices. It is therefore preferred that the ratio of monobrominated and polybrominated monomer units in the latex be such that the corresponding mixture of the unsaturated ring-brominated aromatic monomers is liquid at room temperature. For example, a preferred material for use in the preparation of the coatings of the present invention is the previously identified dibromostyrene composition as produced by Great Lakes Chemical Corporation, which composition is liquid at room temperature and comprises a mixture of 15 percent monobromostyrene, 82 percent dibromostyrene and 3 percent tribromostyrene. Other mono- and polybrominated aromatic monomer mixtures which are liquid at room temperature are similarly preferred for preparation of the present latex coatings. The mixtures preferably include as high an overall percentage of bromine as possible while still being a liquid at room temperature.

In a first embodiment of the present invention, the polymer latex coatings contain the ring-brominated aromatic monomer units (I) and also include alkyl (meth)acrylate monomer units of the formula (II):

(II):

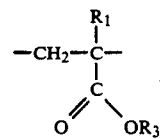

in which $R_1$ is —H or —$CH_3$, and $R_3$ is an alkyl group of 1 to 20 carbon atoms. Representative alkyl (meth)acrylates useful in accordance with the present invention are methyl acrylate, ethyl acrylate, n-propyl acrylate, isopropyl acrylate, n-butyl acrylate, isobutyl acrylate, n-amyl acrylate, n-hexyl acrylate, isohexyl acrylate, 2-ethylhexyl acrylate, n-heptyl acrylate, isoheptyl acrylate, 1-methyl-heptyl acrylate, n-octyl acrylate, isooctyl acrylates such as 6-methyl-heptyl acrylate, n-nonyl acrylate, isononyl acrylates such as 3,5,5-trimethylhexyl acrylate, n-decyl acrylate, lauryl acrylate and corresponding alkyl methacrylates and other primary, secondary and tertiary higher alkyl acrylates and methacrylates, where the alkyl radical can vary from 1 to 20 carbon atoms with the preferred species being those having 2 to 10 carbon atoms. In addition, the hydroxy alkyl esters of acrylic acid or methacrylic acid are useful in this invention. The preferred monomers are ethyl acrylate, n-propyl acrylate, n-butyl acrylate and 2-ethylhexyl acrylate, and methyl methacrylate.

In one aspect of the first embodiment of the present invention, the latex coatings comprise the ring-brominated aromatic monomer units and the alkyl acrylate and/or alkyl methacrylate monomer units. As discussed, the ring-brominated aromatic monomer units are preferably present in an amount to provide from 7 to 20 percent, and more preferably from 9 to 18 percent, bromine by weight of the overall coating. Also, the ring-brominated aromatic monomer units preferably include an average of at least about 1.5 bromines per unit. In another aspect of this first embodiment of the inventive coatings, the coating consists essentially of the ring-brominated aromatic monomer units and the alkyl acrylate/methacrylate monomer units.

In a second embodiment of the present invention, the latex coatings include the ring-brominated aromatic monomer units (I) and the alkyl acrylate/methacrylate monomer units (II), and further include third monomer units of either unsaturated esters of saturated carboxylic acid monomer units (III), non-brominated aromatic monomer units (IV) or carboxylic or dicarboxylic acid monomer units (V).

The acid ester monomer units have the formula (III):

(III):

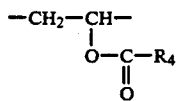

in which $R_4$ is an alkyl group of 1 to 3 carbon atoms. Representative acid ester monomer units include vinyl acetate, vinyl propionate and vinyl butyrate, with vinyl acetate being preferred.

The non-brominated aromatic monomer units have the formula (IV):

(IV):

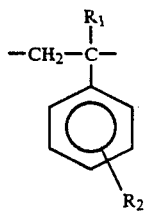

in which $R_1$ and $R_2$ are as previously defined. Typical halogen-free aromatic monomers are styrene, α-methylstyrene, methylstyrene, α-methyl methylstyrene, ethylstyrene and α-methyl ethylstyrene, with styrene or α-methylstyrene being preferred.

The carboxylic or dicarboxylic acid monomer units have the formula (V):

(V):

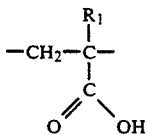

or:

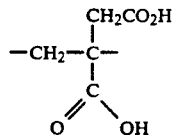

or:

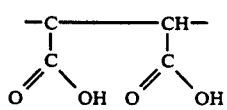

in which $R_1$ is —H or —$CH_3$. Representative ethylenically unsaturated carboxylic acid monomers are acrylic acid, methacrylic acid, itaconic acid, maleic acid and fumaric acid. The preferred acids are acrylic and methacrylic acids. Selection of the ring-brominated aromatic monomer units and the alkyl acrylate/methacrylate monomer units are as previously described. In a related aspect of the present invention, the coatings consist essentially of the ring-brominated aromatic monomer units (I), the alkyl acrylate/methacrylate monomer units (II), and the third units selected from the group consisting of the acid ester monomer units (III), the non-brominated aromatic monomer units (IV) or, the carboxylic or dicarboxylic acid monomer units (V).

In a third embodiment of the present invention, there are provided latex coatings including the ring-brominated aromatic monomer units (I), the alkyl acrylate/methacrylate monomer units (II), non-brominated aromatic monomer units (IV) and carboxylic or dicarboxylic acid monomer units (V).

In a related aspect, the coatings consist essentially of the ring-brominated aromatic monomer units (I), the alkyl acrylate/methacrylate monomer units (II), the non-brominated aromatic monomer units (IV) and the carboxylic or dicarboxylic acid monomer units (V). The monomer units other than the ring-brominated aromatic monomer units may be included at various percentages.

Advantageously, the coatings of the present invention may be prepared and applied in accordance with conventional methods. For example, the latices are prepared by polymerizing in the emulsion system (water, emulsifier, initiator, and chain transfer agent) 100 parts by weight total monomers in the ratio desired in the coating. Techniques for preparation of the latices include solution, bulk, emulsion and suspension polymerization. Suitable initiators include the initiators used for free radical polymerization such as organic peroxides, hydroperoxides, azo or diazo compounds, persulfates, redox systems, such as hydrogen peroxide-ferrous iron, persulfate redox systems, oil-soluble peroxygen compounds with ferrous iron, hydroperoxide-polyamine systems and others. Suitable emulsifiers include anionic, cationic, nonionic or amphoteric emulsifiers. Useful chain transfer agents include aliphatic, aryl mercaptans and disulfides, $CCl_4$, $CBr_4$, $CHI_3$ and $CHCl_3$, etc. Among these, mercaptans are preferred.

Polymerization may be carried out in the presence of air. Faster reactions are observed in the absence of oxygen at temperatures ranging from $-30°$ to $110°$ C., with preferred temperatures ranging from about $0°$ C. to about $80°$ C.

The polymer latices are then applied in conventional fashion to yield fire retardant fabric backcoatings, paints, adhesives, sealants, caulking, non-woven binders, etc. Monomer selection is based upon the final application of the coating. Criteria include the glass transition temperature (Tg), physical properties and chemical resistance desired.

The first factor to be taken into account in the choice of a monomer or monomer mixture is the glass transition temperature (Tg) of the polymer desired. This is the characteristic temperature at which the system undergoes a change from a hard, brittle material to a softer, more flexible one. Since polymers are generally unable to form films from latexes at temperatures below the Tg, a requirement is that the polymer be above the Tg at the application and use temperature. A further restriction is placed on the Tg of the polymer by the fact that polymers become very soft at temperatures too far above the Tg, resulting in poor hardness, blocking, abrasion resistance, dirt collection, and so on. A balance must be obtained, therefore, between the good flexibility, adhesion, coalescence, and so forth, obtained at temperatures farther above the Tg and the good mechanical resistance properties found closer to the Tg. This is generally accomplished in coatings intended for ambient use by using polymers having Tg's in the −30° to 30° C. range, with preferred Tg's in the range of 0° to 30° C.

The flame retardant latices used in the present invention may be admixed with other latex compositions, including non-flame retardant latices, to provide coatings having enhanced properties. In particular, the combination of the flame retardant latices used herein with other latices will yield coatings having improved flame retardancy. The latices of the present invention may then be provided with sufficient levels of bromine to yield the desired levels, such as previously indicated, for the resulting combined latices and coatings. Improvement in properties may also be achieved for coatings from such mixtures with respect to such aspects as adhesion, film forming, chemical resistance and flexibility.

The following Examples are illustrative and not restrictive in nature. Percents indicated are percents by weight unless indicated otherwise.

EXAMPLES 1-5

Preparation of DBS/2-EHA Copolymer Latices

A series of emulsion polymerizations of dibromostyrene (DBS)/2-ethylhexyl acrylate (2-EHA) were carried out in 8 oz. bottles. All the ingredients (122.50 or 180 parts by weight deionized water, 3 parts sodium dodecyl sulfate, 0.3 parts potassium persulfate, 0.2 parts t-dodecyl mercaptan and 100 parts total monomers in the ratio desired in the polymer) were charged into 8 oz. bottles and flushed well with nitrogen, and then reacted at 50° C. to about 45.8 or 36.5% solids in 15 hr. The whole bottle was cooled to room temperature and 3 parts deionized water and 0.18 parts 50% $H_2O_2$ added, followed by agitation for 20 minutes. The results of these preparations are set forth in Table I. The latices in Examples 1 and 2 perform well in a variety of coating applications, and display improved flame retardancy, while the latices in Examples 3 through 5 give very soft and tacky coatings.

TABLE I

| | Preparation of DBS/2-EHA Copolymer Latices | | | | |
|---|---|---|---|---|---|
| Example | Monomer Charge DBS/2-EHA | Reaction Time, hr | Solids % | Conversion % | $Tg^1$ °C. |
| 1 | 34:66 | 15 | 45.8 | 100 | −27.4 |
| 2 | 30:70 | 15 | 45.8 | 100 | −33.4 |
| 3 | 20:80 | 15 | 45.8 | 100 | −47.0 |
| 4 | 15:85 | 15 | 36.5 | 100 | −53.2 |
| 5 | 12:88 | 15 | 36.5 | 100 | −56.8 |

[1]Calculated Tg values according to the following equation:
$$\frac{1}{T_g} = \frac{W_1}{T_{g1}} + \frac{W_2}{T_{g2}} + \ldots = \frac{W_n}{T_{gn}}$$

where Tg = multipolymer Tg in ° K., $W_n$ = weight fraction of the monomer present and $T_{gn}$ = the homopolymer Tg in ° K. (DBS, 414° K. and 2-EHA, 203° K.)

Excellent latex compositions are similarly obtained by repetition of the foregoing methods with, for example, ethyl acrylate, n-propyl acrylate and n-butyl acrylate.

EXAMPLES 6-11

Preparation of DBS/2-EHA/VAc Terpolymer Latices

The general procedure of Examples 1-5 was repeated to prepare terpolymer latices which contained 0-30 percent by weight of dibromostyrene (DBS), 15-80 percent by weight of 2-ethylhexyl acrylate (2EEHA) and 10-85 percent by weight of vinyl acetate (VAc). The reaction reached 95-100% conversion at 34.7-36.5% solids in 15-16.25 hr at 50° C., as shown in Table II. The latices in Examples 6 through 9 perform well in a variety of coating applications, and display improved flame retardancy, while the latex in Example 10 gives a very soft and tacky coating. The latex in Example 11 displays no flame retardancy. Similarly good latex compositions are obtained by repetition of the foregoing preparation with replacement of the 2-ethylhexyl acrylate with ethyl acrylate, n-propyl acrylate, n-butyl acrylate and methyl methacrylate, and with replacement of the vinyl acetate with vinyl propionate and vinyl butyrate. The latices perform well in a variety of coating applications, and display improved flame retardancy.

TABLE II

| | Preparation of DBS/2-EHA/VAc Terpolymer Latices | | | | |
|---|---|---|---|---|---|
| Example | Monomer Charge DBS/2-EHA/VAc | Reaction Time, hr | Solids % | Conversion % | $Tg^1$ °C. |
| 6 | 30:32:38 | 15 | 35.7 | 98 | 8.3 |
| 7 | 20:60:20 | 15 | 34.7 | 95 | −29.0 |
| 8 | 20:40:40 | 15 | 35.7 | 98 | −8.0 |
| 9 | 20:20:60 | 15 | 35.7 | 98 | 17.0 |
| 10 | 10:80:10 | 16.25 | 36.5 | 100 | −51.4 |
| 11 | 0:15:85 | 16.25 | 35.9 | 98 | 9.2 |

[1]Calculated Tg values (DBS, 414° K.; 2-EHA, 203° K. and VAC, 303° K.)

EXAMPLES 12-17

Preparation of DBS/2-EHA/S Terpolymer Latices

The general procedure of Examples 1-5 was repeated to prepare terpolymer latices which contained 0-20 percent by weight of dirromostyrene (DBS), 10-60 percent by weight of 2-ethylhexyl acrylate (2-EHA) and 20-90 percent by weight of styrene (S). The monomers were polymerized to 91-100 percent conversion at 33.2-36.5 percent solids in 15-18.25 hr at 50° C., as indicated in Table III. The latices in Examples 12, 13, 15 and 16 perform well in a variety of coating applications, and display improved flame retardancy, while the latices in Examples 14 and 17 give excessively stiff coatings and form no film at room temperature. Similarly good latex compositions are obtained by repetition of the foregoing preparation with replacement of the 2-ethylhexyl acrylate with ethyl acrylate, n-propyl acrylate, n-butyl acrylate and methyl methacrylate, and with replacement of the styrene with methylstyrene, α-methylstyrene, α-methyl methylstyrene, ethylstyrene and α-methyl ethylstyrene. The latices perform well in a variety of coating applications, and display improved flame retardancy.

TABLE III

| | Preparation of DBS/2-EHA/S Terpolymer Latices | | | | |
|---|---|---|---|---|---|
| Example | Monomer Charge DBS/2-EHA/S | Reaction Time, hr | Solids % | Conversion % | $Tg^1$ °C. |
| 12 | 20:60:20 | 15.58 | 33.2 | 91 | −21.4 |
| 13 | 20:40:40 | 15.58 | 36.5 | 100 | 10.6 |
| 14 | 20:20:60 | 15 | 35.5 | 97 | 52.0 |
| 15 | 15:40:45 | 18.25 | 36.1 | 99 | 9.6 |
| 16 | 10:40:50 | 18.25 | 36.1 | 99 | 8.5 |
| 17 | 0:10:90 | 18.25 | 36.1 | 99 | 71.2 |

[1]Calculated Tg values (DBS, 414° K.; 2-EHA, 203° K. and S, 373° K.)

EXAMPLES 18-24

Preparation of DRS, MAA and either EA or BA Terpolymer Latices

Emulsion polymerizations of dibromostyrene (DBS)/ethyl acrylate (EA) or butyl acrylate (BA)/methacrylic acid (MAA) were carried out in 8 oz. bottles. The ingredients comprising 103.67 parts by weight deionized water, 3 parts sodium dodecyl sulfate, 0.3 parts potassium persulfate, 0.3 parts sodium bisulfite, with 0.2 parts or without t-dodecyl mercaptan, and 20-30 parts DBS, 0-80parts EA or BA and 0-8 parts MAA were charged into 8 oz. bottles and flushed well with nitrogen, and then reacted at 50 ° C. to about 50% solids in 7 hr. The whole bottle was cooled to room temperature and neutralized with 1% NaOH to a pH of 7. The results of these preparations are set forth in Table IV. The latices in Examples 18 through 24 perform well in a variety of coating applications, and display improved flame retardancy. Similarly good latex compositions are obtained by repetition of the foregoing preparation with replacement of the ethyl acrylate or butyl acrylate with n-propyl acrylate and 2-ethylhexyl acrylate, and with replacement of the methacrylic acid with acrylic acid, itaconic acid, maleic acid and fumaric acid. The latices perform well in a variety of coating applications, and display improved flame retardancy.

TABLE IV

Preparation of DBS, MAA and either EA or BA Terpolymer Latices

| Example | Monomer Charge DBS/EA/BA/MAA | Reaction Time, hr | Solids % | Conversion % | Tg[1] °C. |
|---|---|---|---|---|---|
| 18 | 20:78:0:2 | 7 | 50 | 100 | 2.4 |
| 19 | 20:79:0:1 | 7 | 50 | 100 | −0.9 |
| 20 | 30:0:67:3 | 7 | 50 | 100 | −14.7 |
| 21 | 20:0:77:3 | 7 | 50 | 100 | −28.6 |
| 22 | 20:0:76:4 | 7 | 50 | 100 | −27.0 |
| 23 | 20:0:74:6 | 7 | 50 | 100 | −23.8 |
| 24 | 20:0:72:8 | 7 | 50 | 100 | −20.5 |

[1]Calculated Tg values (DBS, 414° K.; EA, 251° K.; BA, 217° K., and MAA 501° K.)

EXAMPLES 25-28

Preparation of DBS, MAA and either 2-EHA or EA Terpolymer Latices

The general procedure of Examples 18-24 was repeated to prepare terpolymer latices which contained 20-25 percent by weight of dibromostyrene (DBS), 0-65 percent by weight of 2-ethylhexyl acrylate (2-EHA) or ethyl acrylate (EA), and 15-23 percent by weight of methyl methacrylate (MMA). The reactions reached 100 percent conversion at 50% solids at 50° C. in 9 hr, as shown in Table V. The latices in Examples 25 through 28 perform well in a variety of coating applications, and display improved flame retardancy. Similarly good latex compositions are obtained by repetition of the foregoing preparation with replacement of the 2-EHA or EA with n-propyl acrylate and butyl acrylate, and with replacement of the MMA with ethyl methacrylate, isopropyl methacrylate and t-butyl methacrylate. The latices perform well in a variety of coating applications, and display improved flame retardancy.

TABLE V

Preparation of DBS, MAA and either 2-EHA or EA Terpolymer Latices

| Example | Monomer Charge DBS/2-EHA/EA/MAA | Reaction Time, hr | Solids % | Conversion % | Tg[1] °C. |
|---|---|---|---|---|---|
| 25 | 20:65:0:15 | 9 | 50 | 100 | −28.0 |
| 26 | 20:57:0:23 | 9 | 50 | 100 | −16.6 |
| 27 | 25:0:57:18 | 9 | 50 | 100 | 25.4 |
| 28 | 20:0:57:23 | 9 | 50 | 100 | 24.4 |

[1]Calculated Tg values (DBS, 414° K.; 2-EHA, 203° K.; EA, 251° K., and MAA, 378° K.)

EXAMPLES 29-30

Preparation of DBS/EA/MMA/MAA Tetrapolymer Latices

Preparation of 0-20 percent dibromostyrene (DBS), 65 percent ethyl acrylate (EA), 13-33 percent methyl methacrylate (MMA) and 2 percent methacrylic acid (MAA) tetrapolymer latices was carried out in 8 oz. bottle by the same technique as described in Examples 1-5 except that 7.56 parts alkyl aryl polyether alcohol (Triton X-207 from Rohm & Haas, Philadelphia, Pa.) was dissolved in 100 parts total monomers and charged into the bottle containing 0.12 parts $(NH_4)_2S_2O_8$, 0.16 parts $NaHSO_3$ and 113.51 parts deionized water. The reactions reached 93-95 percent conversion at 45.3-46.3 percent solids at 65° C. in 2.5-4.5 hr, as shown in Table VI. The product was cooled to 30° C., strained, and the pH adjusted to 9.5 with 2-amino-2-methyl-1-propanol. The latex in Example 29 performs well in a variety of coating applications, and displays improved flame retardancy, while the latex in Example 30 gives no flame retardancy. Similarly good latex compositions are obtained by repetition of the foregoing preparation with replacement of the ethyl acrylate with 2-ethylhexyl acrylate, n-propyl acrylate and n-butyl acrylate, with replacement of the methyl methacrylate with ethyl methacrylate, isopropyl methacrylate, and t-butyl methacrylate, and with replacement of the methacrylic acid with acrylic acid, itaconic acid, maleic acid and fumaric acid. The latices perform well in a variety of coating applications, and display improved flame retardancy, indicated by an oxygen index of 25.

TABLE VI

Preparation of DBS/EA/MMA/MAA Tetrapolymer Latices

| Example | Monomer Charge DBS/EA/MMA/MAA | Reaction Time, hr | Solids % | Conversion % | Oxygen Index | Tg[1] °C. |
|---|---|---|---|---|---|---|
| 29 | 20:65:13:2 | 4.5 | 45.3 | 93 | 25 | 16.3 |
| 30 | 0:65:33:2 | 2.5 | 46.3 | 95 | 23 | 12.5 |

[1]Calculated Tg values (DBS, 414° K.; EA, 251° K.; MMA, 378° K., and MAA, 501° K.)

EXAMPLES 31-34

Preparation of DBS/BA/S/MAA Tetrapolymer Latices

The general procedure of Examples 29-30 was repeated to prepare tetrapolymer latices which contained 0-30 percent by weight of dibromostyrene (DBS), 55-78 percent by weight of butyl acrylate (BA), 0-43 percent by weight of styrene (S) and 2-3 percent by weight of methacrylic acid (MAA). The reaction reached 94–97 percent conversion at 43.9–46.2 percent solids at 65° C. in 3.67–19.75 hr, as shown in Table VII. The product was cooled to 30° C., strained, and the pH adjusted to 9.5 with 2-amino-2-methyl-1-propanol. The latices in Examples 31 through 33 perform well in a variety of coating applications, and display improved flame retardancy, while the latex in Example 34 gives no flame retardancy. Similarly good latex compositions are obtained by repetition of the foregoing preparation with replacement of the butyl acrylate with ethyl acrylate, n-propyl acrylate and 2-ethylhexyl acrylate, with replacement of the styrene with methylstyrene, α-methylstyrene, α-methyl methylstyrene, ethylstyrene and α-methyl ethylstyrene, and with replacement of the methacrylic acid with acrylic acid, itaconic acid, maleic acid and fumaric acid. The latices perform well in a variety of coating applications, and display improved flame retardancy, indicated by an oxygen index of 24.

to increase to 50° C. and held there for 16 hours while rotating about a horizontal axis.

The resultant latex emulsion was allowed to cool and was then applied to 100% polyester fabric weighing 6 oz/yd$^2$. The treated fabric was dried for one hour at 100° C. The dry add-on was 2.8 oz/yd$^2$.

The coating had good flexibility, high temperature strength and acceptable tackiness. The coated fabric was tested for flammability by Motor Vehicle Safety Standard 302 (MVSS-302). The flame failed to burn to the 1-½ in. gauge line, resulting in an SE (best) flammability rating.

A second latex was prepared in an identical manner except that dibromostyrene was omitted. Resultant coated fabric prepared similarly burned the full 10 inches beyond the 1-½ in. gauge mark when tested by MSSS-302, resulting in an RB (worst) flammability rating.

TABLE VII

Preparation of DBS/BA/S/MAA Tetrapolymer Latices

| Example | Monomer Charge DBS/BA/S/MAA | Reaction Time, hr | Solids % | Conversion % | Oxygen Index | Tg$^1$ °C. |
|---|---|---|---|---|---|---|
| 31 | 30:67:0:3$^2$ | 17 | 44.0 | 97 | 24 | −14.7 |
| 32 | 20:78:0:2$^3$ | 3.67 | 43.9 | 97 | — | −30.1 |
| 33 | 20:55:23:2 | 19.75 | 46.2 | 95 | 24 | −0.8 |
| 34 | 0:55:43:2 | 14 | 45.8 | 94 | 22 | −4.7 |

$^1$Calculated Tg values (DBS, 414° K.; BA, 217° K.; S, 373° K., and MAA, 501° K.)
$^2$Using 5 parts block copolymer of propylene oxide and ethylene oxide (F108, BASF Wyannotte Corp., Parsippany, N.J.).
$^3$Using 7.59 parts octylphenoxy polyethoxy ethanol (Triton X-165, Rohm & Haas).

EXAMPLE 35

Preparation of Related Copolymer Latices

The preparation of related latex compositions as described previously also yields equally advantageous products. For example, in place of dibromostyrene there is used a variety of ethylenically-unsaturated, ring-brominated aromatic monomers such as methylstyrene, α-methylstyrene, α-methyl methylstyrene, ethylstyrene and α-methyl ethylstyrene (with mono, di, tri and tetra bromine substitution in the benzene ring). In particular, brominated aromatic monomers including polybrominated units, and especially mixtures which are liquid at room temperature and have an average of at least 1.5 bromines per unit, permit ready preparation of the inventive latices, and yield coatings which have improved flame retardancy and good physical properties and are useful in a variety of coating applications. Similarly, superior flame retardant latex compositions are obtained by preparations according to the earlier Examples with the use of alternate monomers as described previously in the text. The choice of monomers is primarily dependent on the physical properties desired for the resulting latices, and the presence of the ring-brominated aromatic monomer units provides increased flame retardancy for the resultant coatings.

EXAMPLE 36

Textile Backcoating

A latex was prepared by charging to a pressure vessel 180 parts by weight water, 3 parts sodium dodecyl sulfate, and 0.3 parts potassium persulfate. To this mixture was added a blend of 0.2 parts t-dodecyl mercaptan, 30 parts dibromostyrene, 60 parts 2-ethylhexyl acrylate, 8 parts ethyl acrylate, and 2 parts methacrylic acid. The temperature of the sealed vessel was allowed

EXAMPLE 37

Textile Backcoating

A pressure bottle was charged with 122.5 parts by weight water, 3 parts sodium lauryl sulfate and 0.3 parts potassium persulfate.

To this solution was added 70 parts dibromostyrene, 30 parts 2-ethylhexyl acrylate and 0.2 t-dodecyl mercaptan. The mixture was agitated for 16 hours at 50° C.

A total of 8.5 parts Rhoplex HA-24(44.5% solids) non-flame retardant acrylic latex binder (Rohm & Haas) and 34 parts of the latex composition (45.8% solids) were blended thoroughly and coated onto a 6 oz/yd$^2$ 100% polyester fabric. After drying for 30 minutes at 95° C., the pick up weight was calculated as 5.7 oz/yd$^2$.

When tested by MVSS-302 the coated fabric yielded an SE (best) flammability rating. A fabric coated with only Rhoplex HA-24 latex burned the entire length when tested by MVSS-302 yielding an RB (worst) rating.

EXAMPLE 38

Latex Based Paint

Into a pressure bottle containing 0.12 parts by weight ammonium persulfate, 0.16 parts sodium bisulfite and 113.51 parts water was charged 7.56 parts Triton X-207 (from Rohm & Haas, Philadelphia, Pa.) dissolved in 100 parts monomers. The monomers consisted of 20 parts dibromostyrene, 55 parts butyl acrylate, 23 parts styrene, and 2 parts methacrylic acid.

The temperature of the sealed vessel was allowed to reach 65° C. and maintained for 4.5 hours while rotating about a horizontal axis. The product was then cooled to 30° C., strained, and the PH adjusted to 9.5 with 2-amino-2-methyl-1-propanol.

An open vessel with continuous high shear mixing was charged with 40 parts by weight water, 0.15 parts antifoaming agents, dispersants and surfactants Tamol 731 (0.4 parts), Triton X-207 (0.28 parts), and Silwet L-7602 (0.28 parts) (Tamol and Triton are products of Rohm and Haas, Silwet is a product of Union Carbide), 0.62 parts sodium polyacrylate thickener, 18 parts titanium dioxide, 28.3 parts calcium carbonate, and 7.34 parts 1-butanol. The mixing speed was reduced to lower shear conditions. Fifty (50) parts of latex was added. This was followed by 1.15 parts methyl Cellosolve (Union Carbide), 4.58 parts water, and 2.98 parts sodium polyacrylate thickener.

The paint produced had good adhesion and film forming characteristics. It was used to coat 1 mil Mylar to a 10 mil wet thickness using a laboratory coating machine. The dry film thickness was 3 mils. An analogous paint was produced by the same procedures except that 20 additional parts styrene monomer was used in place of dibromostyrene in preparing the latex.

Both paints were tested using the limiting oxygen index test (ASTM D-2863) to determine if the small quantity of dibromostyrene had an effect upon flammability. The paint film without dibromostyrene has a limiting oxygen index of 22. The paint containing dibromostyrene has a limiting oxygen index of 24, a significant improvement in flame retardancy.

EXAMPLE 39

Contact Adhesive

To a pressure bottle was charged 125 parts by weight water, 2 parts sodium dodecyl sulfate, 0.2 parts t-dodecyl mercaptan and 0.3 parts potassium persulfate. Upon mixing, 20 parts dibromostyrene, 75 parts ethyl acrylate, 3 parts acrylonitrile, and 2 parts acrylic acid were added. The bottle was sealed under nitrogen. The temperature was maintained at 53° C for 16 hours while rotating about a horizontal axis. After cooling to room temperature, the bottle was opened and 0.15 parts 50% $H_2O_2$ were added.

The resultant latex was coated onto 0.5 mil Mylar polyester film. The film was dried for two minutes at 150° F. Two pieces of coated polyester film, which were still warm, were pressed together and rolled with a roller, taking care to avoid wrinkling.

Peel strength was judged to be adequate when the two layers of Mylar had approximately 1 gram per square foot of latex adhesive between them. The Mylar latex composite was wrapped loosely around a 4 in. diameter cylinder of fiberglass batt insulation and secured with staples. A 3 in. blue methane bunsen burner flame was placed against the lower and side surfaces of the batt/Mylar construction which was positioned at a 45° angle from vertical. There was no observable afterflame when the burner flame was removed after 10-15 seconds of contact.

A similar construction using latex containing styrene substituted for dibromostyrene was prepared. When the burner flame was removed, flame propagated upward from the point of contact until it was extinguished with a water jet 30-60 seconds later.

EXAMPLE 40

Latex Sealant

The latex composition described in Example 39 was used in a caulk formulation. To 100 parts by weight latex were added 2 parts Triton X-405 (Rohm and Haas, Philadelphia, Pa.), 23 parts butyl benzyl phthalate, 4 parts Varsol #1 (Exxon), 2.5 parts ethylene glycol, 2 parts Composition T dispersant (Calgon), 120 parts calcium carbonate (2 micron avg. particle size) and 2.5 parts titanium oxide. The resultant caulk adheres well to a number of substrates, including wood, glass, and concrete.

A bead of caulk about ¼ in. in diameter was placed on a ½ in. wide strip of asbestos cement board. The caulk was tested for flammability by the Butler chimney test (ASTM D-3014). Caulk which was prepared with latex in which styrene was substituted for dibromostyrene had a burn extent greater than 250 mm. The caulk prepared from latex containing dibromostyrene was significantly superior, and burned between 90 and 100 mm.

EXAMPLE 41

Non-Woven Binder

Into a pressure bottle was charged 122.5 parts by weight water, 1.5 parts sodium dodecyl sulfate, 0.25 parts potassium persulfate, 0.2 parts t-dodecyl mercaptan, 20 parts 2-ethylhexyl acrylate, 60 parts vinyl acetate, and 20 parts dibromostyrene. The bottle was flushed with nitrogen and capped. After 16 hours at 55° C. the bottle was cooled to room temperature and 3 parts water and 0.18 parts hydrogen peroxide were added with stirring.

This latex emulsion was placed into a tray. A nonwoven polyester fiber filter medium weighing about 1.25 oz/yd² was pulled through the latex, assuring complete immersion. Upon drying at 300° F. for one minute, the filter media was weighed and found to have a dry pick up of 96%.

A second sample of latex was prepared substituting 20 parts styrene for dibromostyrene. The dry pick up was 71%. Both filter media samples were tested for flammability by exposure to a 4 in. high, 1950° F. propane flame from a Fisher Burner. The filter medium was held 2-½ in. over the top of the burner at a 15° angle from horizontal.

The filter medium which was not bound with latex containing brominated styrene ignited and burned until it was extinguished with a water jet. The extent of burn was greater than 12 in. The filter medium bound with latex containing brominated styrene burned approximately 7-¼ in. from the burner flame and self extinguished, demonstrating superior flammability resistance.

While the invention has been described in detail in the foregoing description and its specific Examples, the same is to be considered as illustrative and not restrictive in character. Only the preferred embodiments have been described, and all changes and modifications that come within the spirit of the invention are desired to be protected.

What is claimed is:

1. In a composite material comprising a substrate and a latex coating adhered thereto, the improvement comprising the coating being a flame retardant latex material comprising ring-brominated aromatic monomer units of the formula (I)

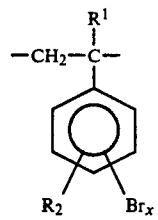

and alkyl (meth)acrylate monomer units of the formula (II)

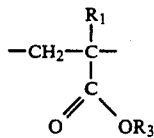

in which $X=1$ to 4, $R_1$ is —H or —$CH_3$, $R_2$ is —H or an alkyl group having from 1 to 4 carbon atoms, and $R_3$ is an alkyl group having from 1 to 20 carbon atoms, and in which the ring-brominated aromatic monomer units are present in an amount to provide from 7 to 20 percent bromine by weight of the overall coating, said coating having a Tg from about −30° C. to about 30° C.

2. The improvement of claim 1 in which the ring-brominated monomer units are present in an amount to provide from 9 to 18 weight percent bromine.

3. The improvement of claim 1 in which the ring-brominated aromatic monomer units include an average of at least about 1.5 bromines per unit.

4. The improvement of claim 1 in which the coating consists essentially of the ring-brominated aromatic monomer units and the alkyl (meth)acrylate monomer units.

5. The improvement of claim 1 in which the coating further comprises third monomer units selected from the group consisting of (a) acid ester monomer units of the formula (III)

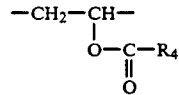

(b) non-brominated aromatic monomer units of the formula (IV)

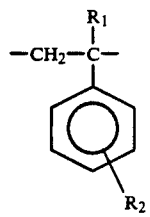

and
(c) carboxylic or dicarboxylic acid monomer units of

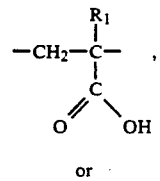 formula (V)

or

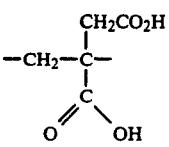 formula (VI)

or

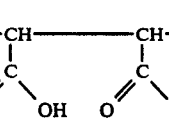 formula (VII)

in which $X=1$ to 4, $R_1$ is —H or —$CH_3$, $R_2$ is —H or an alkyl group having from 1 to 4 carbon atoms and $R_4$ is an alkyl group having from 1 to 3 carbon atoms.

6. The improvement of claim 5 in which the ring-brominated monomer units are present in an amount to provide from 9 to 18 weight percent bromine.

7. The improvement of claim 5 in which the ring-brominated aromatic monomer units include an average of at least about 1.5 bromines per unit.

8. The improvement of claim 5 in which the coating consists essentially of the ring-brominated aromatic monomer units (I), the alkyl (meth)acrylate monomer units (II) and the third monomer units selected from the group consisting of (a) acid ester monomer units (III), (b) non-brominated aromatic monomer units (IV) and (c) carboxylic or dicarboxylic acid monomer units (V or VI or VII).

9. The improvement of claim 1 in which the coating further comprises non-brominated aromatic monomer units of the formula (IV)

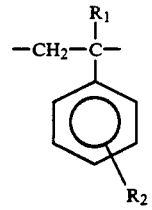

and carboxylic or dicarboxylic acid monomer units of

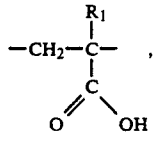 formula (V)

or

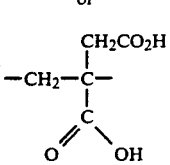 formula (VI)

or

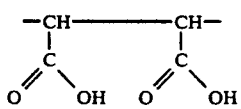
formula (VII)

in which X=1 to 4, $R_1$ is —H or —$CH_3$ and $R_2$ is —H or an alkyl group having from 1 to 4 carbon atoms.

10. The improvement of claim 9 in which the ring-brominated monomer units are present in an amount to provide from 9 to 18 weight percent bromine.

11. The improvement of claim 9 in which the ring-brominated aromatic monomer units include an average of at least about 1.5 bromines per unit.

12. The improvement of claim 9 in which the coating consists essentially of the ring-brominated aromatic monomer units, the alkyl (meth)acrylate monomer units, the non-brominated aromatic monomer units and the carboxylic or dicarboxylic acid monomer units.

13. The improvement of claim 3 in which the ring-brominated monomer units are present in an amount to provide from 9 to 18 weight percent bromine.

14. The improvement of claim 3 in which the ring-brominated aromatic monomer units include monobrominated and polybrominated units and in which the ratio of monobrominated and polybrominated units is such that the corresponding mixture of the unsaturated ring-brominated aromatic monomers is liquid at room temperature.

15. The improvement of claim 3 in which the coating consists essentially of the ring-brominated aromatic monomer units and the alkyl (meth)acrylate monomer units.

16. The improvement of claim 3 in which the coating further comprises third monomer units selected from the group consisting of (a) acid ester monomer units of the formula (III)

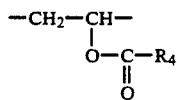

(b) non-brominated aromatic monomer units of the formula (IV)

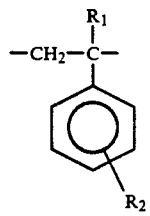

and
(c) carboxylic or dicarboxylic acid monomer units of formula (V)

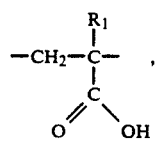
formula (V)

or

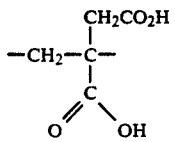
formula (VI)

or

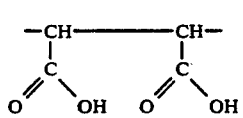
formula (VII)

in which X=1 to 4, $R_1$ is —H or —$CH_3$, $R_2$ is —H or an alkyl group having from 1 to 4 carbon atoms and $R_4$ is an alkyl group having from 1 to 3 carbon atoms.

17. The improvement of claim 16 in which the ring-brominated monomer units are present in an amount to provide from 9 to 18 weight percent bromine.

18. The improvement of claim 16 in which the ring-brominated aromatic monomer units include monobrominated and polybrominated units and in which the ratio of monobrominated and polybrominated units is such that the corresponding mixture of the unsaturated ring-brominated aromatic monomers is liquid at room temperature.

19. The improvement of claim 16 in which the coating consists essentially of the ring-brominated aromatic monomer units (I), the alkyl (meth)acrylate monomer units (II) and the third monomer units selected from the group consisting of (a) acid ester monomer units (III), (b) non-brominated aromatic monomer units (IV) and (c) carboxylic or dicarboxylic acid monomer units (V or VI or VII).

20. The improvement of claim 3 in which the coating further comprises non-brominated aromatic monomer units of the formula (IV)

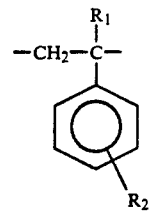

and carboxylic and dicarboxylic acid monomer units of formula (V)

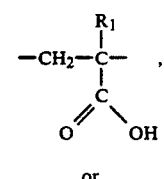
formula (V)

or

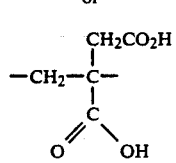
formula (VI)

-continued

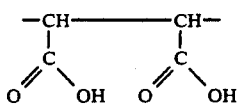
formula (VII)

in which X=1 to 4, $R_1$ is —H or —$CH_3$ and $R_2$ is —H or an alkyl group having from 1 to 4 carbon atoms.

21. The improvement of claim 20 in which the ring-brominated monomer units are present in an amount to provide from 9 to 18 weight percent bromine.

22. The improvement of claim 20 in which the ring-brominated aromatic monomer units include monobrominated and polybrominated units and in which the ratio of monobrominated and polybrominated units is such that the corresponding mixture of the unsaturated ring-brominated aromatic monomers is liquid at room temperature.

23. The improvement of claim 20 in which the coating consists essentially of the ring-brominated aromatic monomer units, the alkyl (meth)acrylate monomer units, the non-brominated aromatic monomer units and the carboxylic or dicarboxylic acid monomer units.

24. The improvement of claim 3 in which the coating latex has a Tg of from about 0° C. to about 30° C.

* * * * *

UNITED STATES PATENT AND TRADEMARK OFFICE
CERTIFICATE OF CORRECTION

PATENT NO. : 5,290,636

DATED : March 1, 1994

INVENTOR(S) : Richard S. Rose; Jin-liang Wang; Nicolai A. Favstritsky; David E. May; David J. Honkomp It is certified that error appears in the above-identified patent and that said Letters Patent is hereby corrected as shown below:

In column 4, line 9, please delete "t" and insert in lieu thereof --to--.

In column 7, formula (V), line 55, please amend the third formula as follows:

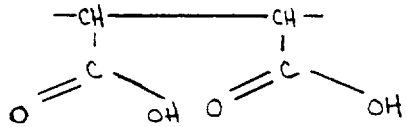

In column 9, line 68, please delete "(2EEHA)" and insert in lieu thereof --(2EHA)--.

In column 11, line 3, please delete "DRS" and insert in lieu thereof --DBS--.

In column 13, Table VII, around lines 31-32, please delete "[2]Using 5 parts block copolymer of propylene oxide and ethylene oxide (F108,BASF Wyannotte Corp., Parsippany, N.J.).  [3]Using 7.59 parts octylphenoxy polyethoxy ethanol (Triton X-165,Rohm & Haas)." pursuant to the Supplemental Amendment filed August 25, 1993.

UNITED STATES PATENT AND TRADEMARK OFFICE
CERTIFICATE OF CORRECTION

PATENT NO. : 5,290,636
DATED : March 1, 1994
INVENTOR(S) : Richard S. Rose, et al.

It is certified that error appears in the above-indentified patent and that said Letters Patent is hereby corrected as shown below:

In column 14, line 17, please delete "MSSS" and insert in lieu thereof --MVSS--.

Signed and Sealed this

Twenty-third Day of January, 1996

Attest:

BRUCE LEHMAN

*Attesting Officer*   *Commissioner of Patents and Trademarks*